United States Patent [19]
Fujimoto et al.

[11] 4,376,701
[45] Mar. 15, 1983

[54] WASTE WATER TREATING APPARATUS

[75] Inventors: Tadao Fujimoto, Kobe; Tadaaki Kawasugi, Nara; Taketoshi Madokoro, Kyoto; Akio Toriyama, Sakai, all of Japan

[73] Assignee: Kubota Ltd., Osaka, Japan

[21] Appl. No.: 239,418

[22] Filed: Mar. 2, 1981

[30] Foreign Application Priority Data

Mar. 7, 1980 [JP] Japan .............................. 55-30269[U]
Mar. 8, 1980 [JP] Japan .............................. 55-29532[U]

[51] Int. Cl.$^3$ ................................................ C02B 1/34
[52] U.S. Cl. .................................... 210/96.1; 210/101; 210/221.2
[58] Field of Search .............. 210/614, 621, 626, 96.1, 210/101, 221.2

[56] References Cited
U.S. PATENT DOCUMENTS 3,684,702 8/1972 Hartmann ............................ 210/614
3,878,094 4/1975 Conley et al. ....................... 210/96.1
4,278,546 7/1981 Roesler ................................ 210/626
4,284,510 8/1981 Savard et al. .................... 210/626 X Primary Examiner—John Adee
Attorney, Agent, or Firm—W. G. Fasse; D. H. Kane, Jr.

[57] ABSTRACT

A waste water treating apparatus comprises an inner chamber and an outer chamber disposed around the inner chamber extending to a considerable depth. The inner and outer chamber communicate with each other at the bottom portion, whereby the inner and outer chambers form a downward and upward flow chamber, respectively, for circulating waste water. The waste water that flows from the downward flow chamber to the upward flow chamber is circulated to the downward flow chamber by means of a pump. An oxygen containing gas is simultaneously supplied into the ciculating waste water. An apparatus for monitoring the concentration of oxygen or carbon dioxide in an exhaust gas is provided at an outlet of the upward flow chamber. The oxygen containing gas being supplied is controlled to a predetermined optimum flow rate in response to the monitored concentration.

14 Claims, 10 Drawing Figures

WASTE WATER TREATING APPARATUS

BACKGROUND OF THE INVENTION

The present invention relates to a waste water treating apparatus which circulates a mixed liquor by means of a pump while supplying an oxygen containing gas into the waste water. More specifically, the present invention relates to a waste water treating apparatus adapted for automatically adjusting an oxygen containing gas being supplied into the waste water as a function of an organic loading contained in the waste water.

DESCRIPTION OF THE PRIOR ART

Generally a waste water treating apparatus is adapted to dissolve an oxygen containing gas into a waste water and an activated sludge to change the carbon of an organic material contained in the waste water to carbon dioxide, whereby the same is discharged into the atmosphere in a harmless form. Accordingly, the oxygen or the oxygen containing gas being supplied must be increased when the organic material content in the waste water is increased. The microorganisms contained in the activated sludge make use of the oxygen containing gas fully dissolved in the water to convert the carbon contained in the waste water to carbon dioxide. Accordingly, one concern in a waste water treating apparatus is how effectively oxygen containing gas is dissolved in the water. However, when an aeration tank is not deep, say 4 m, the air or oxygen containing gas supplied into the water comes upward within approximately ten seconds and the time period of contact of the water with the oxygen containing gas is very short, with the result that the amount of oxygen being dissolved into the water is accordingly small. Therefore, in the case of an increased amount of an organic material contained in the waste water, an amount of oxygen containing gas sufficient to decompose the same cannot be supplied.

On the other hand, the fact that the amount of oxygen containing gas that can be dissolved in water is proportional to the pressure being applied to the water, is known as Henry's law. Therefore, for the purpose of increasing the pressure, an approach may be considered in which the depth of an aeration tank is considerably increased and in fact a waste water treating apparatus of a deep well type of say 100 m depth has been proposed and put into practical use. The solubility of oxygen containing gas in waste water can be enhanced by decreasing the diameter of bubbles being supplied into the waste water, because the interfacial area between the oxygen containing bubbles and the water is increased. For example, in the case of an aeration tank of a deep well type, such as of 100 m depth, the pressure is increased at the bottom area approximately ten times that of an aeration tank of a usual depth. Hence, more oxygen containing gas, as much as 11 times the usual amount, is dissolved in the deeper tank. In addition, since an oxygen containing gas such as an air is supplied by blowing it into a waste water, the oxygen bubbles become very small due to a turbulent flow effect. For example, in the case where the waste water is caused to flow downward at the flow rate of 1 m/second, a turbulent flow effect occurs so that the bubbles become extremely fine. As the bubbles become fine, the time period of contact between the waste water and the bubbles is prolonged and accordingly the solubility of oxygen containing gas is enhanced. Thus, it has been well-known that in order to enhance the solubility of oxygen containing gas into a water it is better to increase the pressure, to decrease the diameter of the bubbles entered into the water and to prolong the time period of contact between the waste water and the bubbles.

U.S. Pat. No. 3,476,366 issued Nov. 4, 1969 to Owen E. Brooks et al is of interest to the present invention. This reference discloses a gas liquid transfer apparatus such as a chemical reactor having an inner tube serving as a mixed liquor downward flow chamber and an outer tube serving as a mixed liquor upward flow chamber. These chambers are adapted such that the water is circulated from the upward flow chamber to the downward flow chamber. A gas is continually supplied to a liquid being processed. U.S. Pat. No. 3,804,255 issued Apr. 16, 1974 to Richard E. Speece is also of interest and basically discloses an apparatus adapted for circulating water by means of a pump while a gas is supplied into the water, as disclosed in the above referenced U.S. Pat. No. 3,476,366, although the U.S. Pat. No. 3,804,255 is mainly concerned with processing of waste water. However, any of the United States Patents fail to teach or suggest anything about changing of a supply amount of a gas in association with or in response to an organic loading of the water being treated.

On the other hand, an article entitled "HYPOLIMNION AERATION" authored by R. E. Speece, appearing in JAWWA (Journal American Water Works Association) January 1971 vol. 63, pages 6 to 9 discloses an apparatus for aerating a deep layer in a dam. The Speece apparatus employs both circulation of water by means of a pump and a deep well for enhancing the solubility of oxygen containing gas due to an increased pressure. However, Speece does not contemplate changing of the supply amount of an oxygen containing gas in association with an organic loading in a deep layer.

As described in the foregoing, although the prior art discloses circulation of water by means of a pump while an oxygen containing gas is supplied into the water, these prior art references fail to contemplate changing of the supply flow rate of an oxygen containing gas in accordance with the variation of an organic loading in a waste water (i.e. a water flow rate x an organic concentration). Accordingly, in case of an excess of an organic loading, the amount of oxygen containing gas supplied is inadequate, whereas in case of a small organic loading the amount of oxygen containing gas supplied becomes excessive. In the former case, the decomposition of an organic material becomes insufficient, whereas in the latter case too much aeration is involved, which makes the solid-liquid separation difficult. Thus, both examples involve an undesired phenomenon. Conventionally, the flow rate of water by means of a pump and the flow rate of oxygen containing gas have been preset to a predetermined flow rate in consideration of the maximum treatment loading of a waste water treating apparatus. Accordingly, more oxygen containing gas is supplied than is actually required without regard to an organic loading and the power cost for the supply of the gas becomes high and uneconomical. Furthermore, if and when a state of a drastically decreased amount of an organic loading continues for a long period of time, the dissolved oxygen becomes excessive and causes autolysis of an activated sludge, whereby the system may be prevented from running continuously or a problem in restarting the next normal running may arise.

SUMMARY OF THE INVENTION

The waste water treating apparatus according to the invention comprises a downward flow chamber disposed for extending in the depth direction and allowing for a flow of waste water, an upward flow chamber disposed adjacent to the downward flow chamber for extending in the depth direction and allowing for an upward flow of the waste water being supplied through the downward flow chamber and circulation means for circulating the waste water from the upward flow chamber to the downward flow chamber. Gas supply means is provided in the downward flow chamber for supplying or blowing an oxygen containing gas into a waste water being supplied to the downward flow chamber. Information representing or relating to the organic loading or organic components contained in the waste water being treated is provided and the supply flow rate of the oxygen containing gas is controlled in response to said organic loading information, whereby a supply flow rate of the oxygen containing gas suited for the particular organic loading is employed.

In a preferred embodiment of the present invention, means is provided for monitoring the concentration of carbon dioxide gas contained in an exhaust gas discharged from the upward flow chamber for the purpose of providing the organic loading representing information. In this case, the organic loading information is represented by the concentration of carbon dioxide gas. Alternatively, means may be provided for monitoring the concentration of oxygen gas contained in the exhaust gas discharged from the upward flow chamber, for the purpose of providing the organic loading information. In this case, the organic loading information is represented by the concentration of oxygen in the exhaust gas.

In a more preferred embodiment of the present invention, the flow rate of the mixed liquor pumped up by the circulation means to be circulated to the downward flow chamber, is set at a predetermined value. Then it is determined whether the flow rate of the oxygen containing gas being supplied has exceeded a flow rate of the oxygen containing gas corresponding to the above described predetermined amount of the water being circulated. In the case where the flow rate of the oxygen containing gas corresponding to the predetermined flow rate of mixed liquor being circulated is exceeded, the circulation means is controlled to attain a flow rate of the mixed liquor being circulated exceeding the above described predetermined flow rate of the mixed liquor.

In a still further preferred embodiment of the present invention, the amount of the organic loading contained in the waste water being treated is directly monitored. A required flow rate of oxygen containing gas being supplied is evaluated in response to the monitored output in accordance with a predetermined functional relation between the organic loading amount and a required flow rate of oxygen containing gas being supplied corresponding thereto. Such functional relation is stored in storage means. The above described oxygen containing gas supply flow rate control means is adapted to control the oxygen containing gas supply flow rate upon comparison of a supply flow rate of the oxygen containing gas in the preceding control cycle and the information obtained from the above described information providing means for each control cycle.

Accordingly, it is a principal object of the present invention to provide a waste water treating apparatus for controlling the flow rate of an oxygen containing gas being supplied in response to the variation of an organic loading in a waste water.

Another object of the present invention is to provide a waste water treating apparatus adapted for controlling the flow rate of an oxygen containing gas being supplied in response to the variation of an organic loading in a waste water, wherein, upon determination that a required flow rate of oxygen containing gas exceeds a flow rate of oxygen containing gas corresponding to a predetermined flow rate of the circulating mixed liquor, the predetermined flow rate of the circulating mixed liquor is increased.

These objects and other objects, features, aspects and advantages of the present invention will become more apparent from the following detailed description of the present invention when taken in conjunction with the accompanying drawings.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
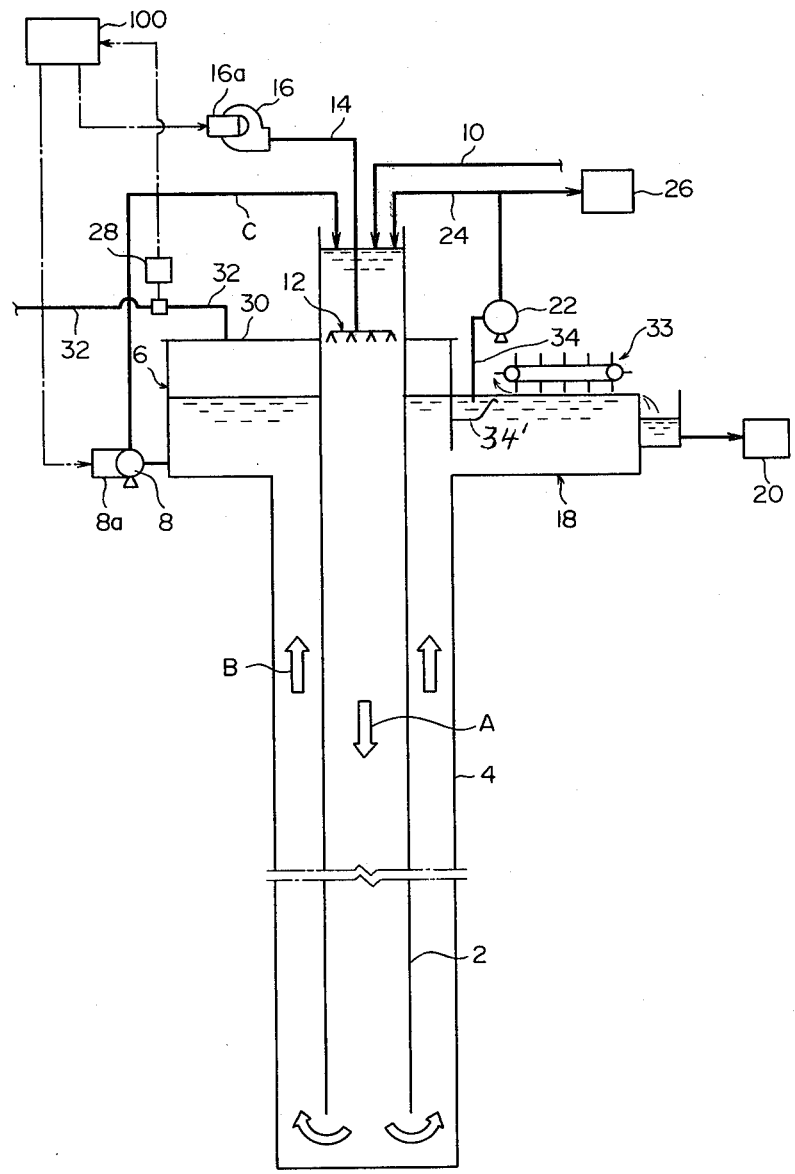
FIG. 1 is a view schematically showing the structural features of a waste water treating apparatus embodying the characteristic features of the present invention.

FIG. 1 is a view showing an outline of the generally known structural features of a waste water treating apparatus equipped with control means in accordance with the present invention. The waste water treating apparatus shown is a so-called deep well type using a pump circulation system. A water treating apparatus of this type comprises an inner tube 2 forming a downward flow chamber A for waste water being supplied, and an outer tube 4 forming an upward flow chamber B disposed to enclose the inner tube 2 in the depth direction, these tubes being buried to extend underground to the depth of say 100 m. The inner tube 2 and the outer tube 4 communicate with each other at the bottom portion. The outer tube 4 is coupled at the upper portion thereof to a tank or a tub 6 having a width larger than that of the outer tube in the lateral direction. The inner tube 2 extends through the tank 6 up to above the tank. A pump 8 of a variable capacity type is coupled to the bottom of the tank 6, so that a flow channel C is formed through the pump 8 to the downward flow path A in the inner tube 2. As a result, the water pumped upwardly through the upward flow path B by the variable capacity type pump 8 is circulated through the flow channel C to the downward flow path A. A supply pipe 10 for the waste water to be treated, such as city sewage, is connected to the entrance of the inner tube 2 or to the tank 6. In the case where the waste water including an activated sludge flows through path B between the inner tube 2 and the outer tube 4, a head is formed due to the resistance and due to a difference of any gas hold up in the two tubes. Such head between the downward flow path or chamber A and the upward flow path or chamber B may be as large as 0.5 to 7.0 m. Therefore, the waste water that is supplied to the downward flow path or chamber A is circulated through the downward flow path or chamber A and through the upward flow path or chamber B. If necessary, the circulation flow rate of the mixed liquor can be changed in accordance with an adjustment of the above described head by changing the flow rate of the mixed liquor being pumped up into the downward flow chamber A by means of the variable capacity type pump 8. This will be described in more detail below. Furthermore, a nozzle 12 is located in the upper portion of the downward flow chamber or path A. The nozzle 12 is coupled to a variable capacity blower 16 through a gas supply flow conduit 14 for an oxygen containing gas which is supplied through the gas supply flow conduit 14 and the nozzle 12 into the waste water when the variable capacity type blower 16 is energized. The supplied oxygen containing gas is dissolved into the mixed liquor, whereby an organic carbon material contained in the waste water is converted into carbon dioxide. As described above, the water treating apparatus shown is of the deep well type having a depth of say 100 m wherein a head as large as 0.5 to 7 m is formed between the downward flow path or chamber A and the upward flow path or chamber B. Therefore, the pressure at the bottom portion of the inner tube 2 and of the outer tube 4 is extremely high and accordingly the oxygen containing gas supplied to the waste water is better dissolved. In addition, as the oxygen containing gas is introduced into the water by the blower 16 and the nozzle 12, a turbulent flow is caused depending on the flow rate of the mixed liquor circulated by the pump 8, whereby the bubbles of the gas introduced into the water become extremely fine. As a result, the time period during which the gas is in contact with the waste water, is prolonged and the solution of oxygen into the waste water is substantially expedited.

A separator 18 is located adjacent to the tank 6 so that the mixed liquor is separated into an activated sludge and a treated purified water. The purified water is fed to an after-treatment apparatus 20, while the activated sludge is transported into a sludge pit 34' by means of a so-called sludge scraper 33. The sludge is fed by a return pump 22 through a suction pipe 34 connected to the sludge pit 34' to the return conduit 24 connected to the downward flow chamber A and to a waste sludge after-treatment apparatus 26.

The feature of the present invention resides in changing the flow rate of an oxygen containing gas that is being supplied into a waste water by means of the blower 16 in response to the amount of the organic loading of the waste water to be treated. To that end, the apparatus comprises means 28 for monitoring the amount of the organic loading, and a control mechanism 100 responsive to the output monitored by the monitoring means 28 for evaluating the oxygen supply flow rate suited for the monitored amount of the organic loading. The control mechanism 100 is adapted to evaluate a required supply flow rate of the oxygen containing gas to control a flow rate control mechanism 16a provided in the variable capacity type blower 16 as a function of the monitored loading value and to provide a control signal to a mixed liquor controlling mechanism 8a provided in the variable capacitance type pump 8. The relationship between the organic loading amount monitoring means 28 and the control mechanism 100, which constitutes the essential feature of the present invention, will be described in detail in the following.

Figure 2:
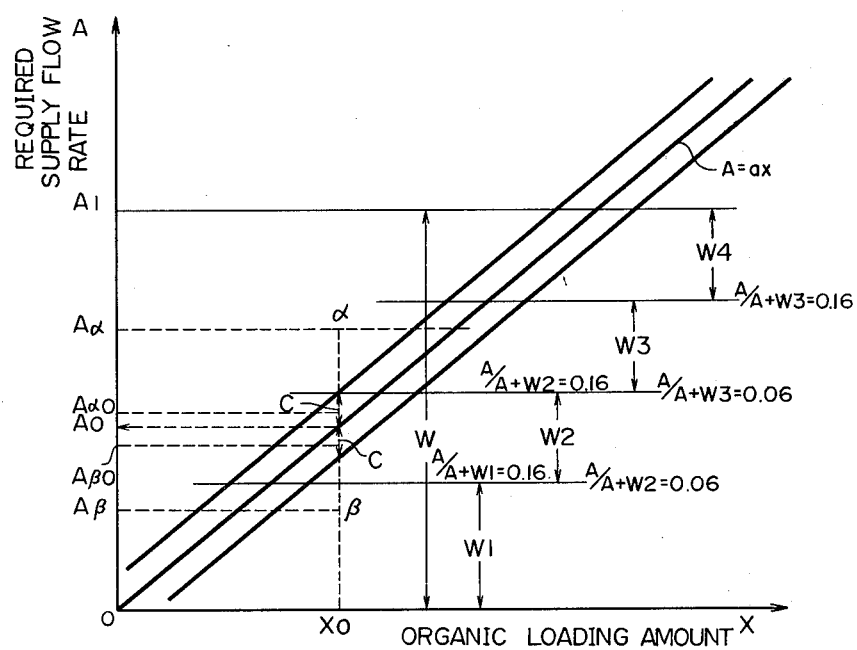
FIG. 2 is a graph showing a required flow rate of oxygen containing gas being supplied as a function of an organic loading amount for explaining the principle of the present invention.

FIG. 2 is a graph for depicting the basic principle of a control in accordance with the present invention. Generally, it has been known that the relationship between an organic loading amount x and a required supply flow rate A of oxygen containing gas is linear. In other words, the relation is expressed by the following formula:

$$A = ax$$

where a is a constant determinable for the particular waste water to be treated. Therefore, assuming that the organic loading amount is $x_0$, a required supply flow rate $A_0$ of oxygen containing gas is expressed as $ax_0$. Theoretically, the required supply flow rate of oxygen containing gas should be evaluated with accuracy in accordance with the above described functional equation. In actuality, however, the supply flow rate of the oxygen containing gas is controlled within some controlling range allowing for the tolerance of the apparatus actually used and to that end a given tolerance range is usually determined for a required supply flow rate of the oxygen containing gas. Assuming that such tolerance range with respect to an ideal value is c, the overall tolerance range is defined by two straight lines expressed as $A = ax + c$ and $A = ax - c$, with the line defined by $A = ax$ at the center between the two range limit lines. Accordingly, by monitoring with accuracy an organic loading contained in a waste water supply that is being treated, it is possible to control the required supply flow rate of oxygen containing gas in a fine manner. In order to directly monitor the amount of the organic loading, for example, an ultraviolet photo meter may be employed to monitor the variation of the light beam which is transmitted through the waste water. By storing in advance the above described function $A = ax$ shown in FIG. 2, a required supply flow rate of oxygen containing gas can be evaluated or can be read out in accordance with the organic loading amount ascertained by monitoring the light intensity using the above mentioned ultraviolet photo meter.

Figure 3:
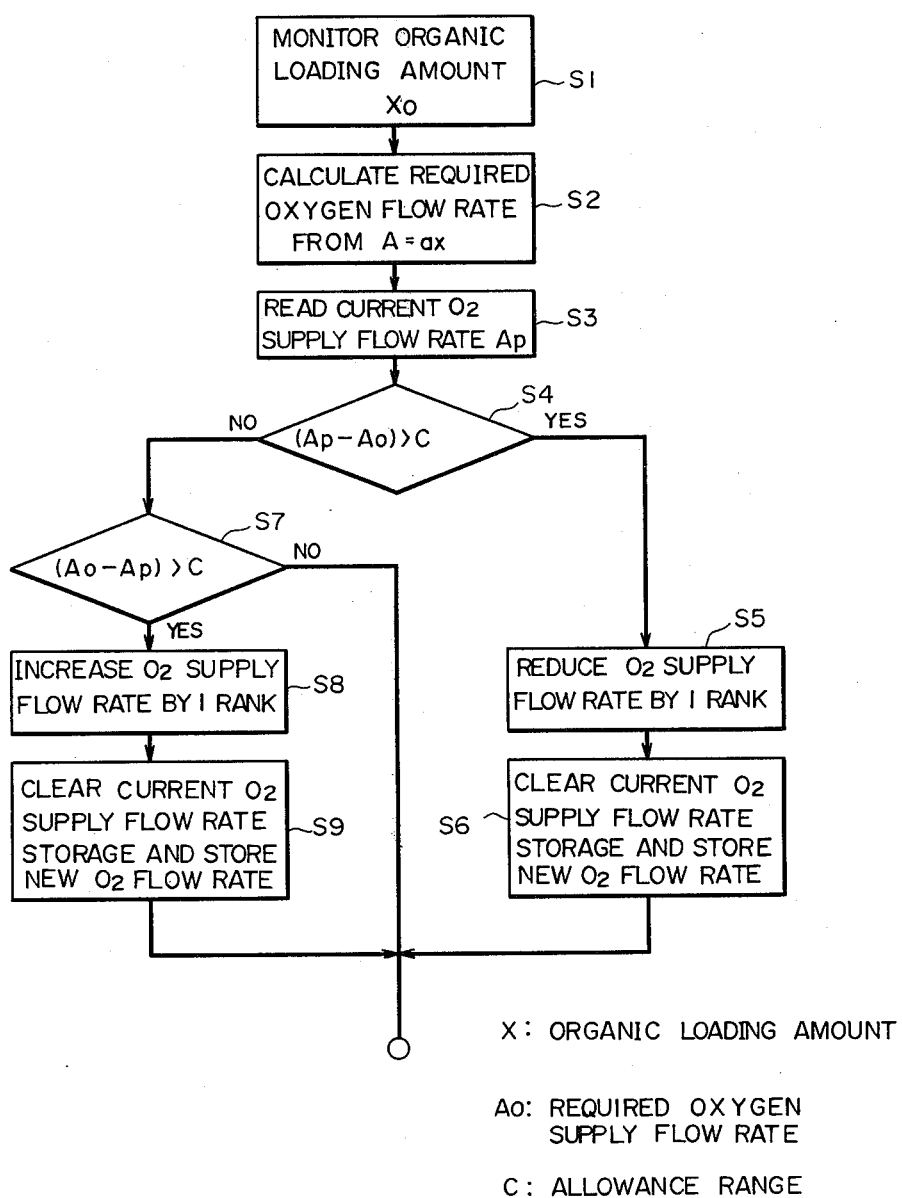
FIG. 3 is a flow diagram illustrating a controlling operation for determining the flow rate of an oxygen containing gas being supplied as a function of the variation of the organic loading.

FIG. 3 is a flow diagram for achieving the above described basic principle shown in FIG. 2. Let it be assumed, that a supply flow rate of oxygen containing gas that is being presently supplied by the variable capacity type blower 16 (FIG. 1) is Ap. The oxygen containing gas supply flow rate Ap is a flow rate evaluated by an arithmetic operation in the preceding cycle. The present oxygen containing gas supply flow rate Ap may be a value obtained by actually measuring a supply flow rate of oxygen containing gas directly supplied from the blower 16. Based on the above assumption, the principle will now be described in detail, first with reference to the case wherein the supply flow rate of the oxygen containing gas is too large.

First, in step S1 an organic loading amount contained in the waste water being treated is monitored by means of an ultraviolet photo meter. Let it be assumed that the monitored value is $x_0$. Then in step S2 a required oxygen containing gas supply flow rate $A_0$ is calculated from the function $A = ax$ stored in advance in a memory, such as a read only memory. In step S3 a supply amount Ap stored in a memory for storing the current oxygen containing gas supply flow rate is read out. The supply flow rate Ap being read out may be a value determined in the preceding cycle or a value obtained by directly monitoring a supply amount of an oxygen containing gas that is being presently supplied and temporarily stored in a memory. In step S4 it is determined whether a value obtained by subtracting the required oxygen containing gas supply flow rate $A_0$ evaluated in step S2, from the current oxygen containing gas supply flow rate Ap exceeds a tolerance range c. Since it has been assumed that the current oxygen containing gas supply flow rate is too large, the difference $(Ap - A_0)$ is larger than the tolerance range c and therefore the program proceeds to the following step wherein the supply flow rate of the oxygen containing gas supplied through the variable capacity blower 16 is reduced by one rank. After the oxygen containing gas supply flow rate has been reduced by one rank, the information stored in the current oxygen containing gas supply flow rate memory is cleared in step S6 and a new oxygen containing gas flow rate as determined in step S5 is stored as Ap. Thus, one control cycle for determining a required oxygen containing gas flow rate is achieved. The just described control cycle is repeated until the current oxygen containing gas supply flow rate falls into the proper corresponding range. Each time the above described control cycle is repeated, the current oxygen containing gas supply flow rate Ap is decreased and at a given repetition cycle the difference $(Ap - A_0)$ becomes smaller than the tolerance range c in step S4. Accordingly, the program proceeds this time to step S7 which determines whether the difference $(A_0 - Ap)$ is larger than the tolerance range c. If and when the current oxygen containing gas supply flow rate is within the tolerance range c shown in FIG. 2, the difference $(A_0 - Ap)$ is smaller than the tolerance range c. Therefore, the decision in step S7 is NO and the program proceeds to the start of the next cycle. Thus, the oxygen containing gas supply flow rate is controlled to become a proper oxygen containing gas supply flow rate corresponding to a monitored organic loading amount.

Second, the case will now be considered where the current oxygen containing gas supply flow rate is too small.

The program proceeds from step S1 to step S4 in the same manner as described in the above first case. However, since it has been assumed that the current oxygen containing gas supply flow rate is too small, it is determined in step 4 that the difference $(Ap - A_0)$ is smaller than the tolerance range c. As a result, the program proceeds to the following step S7. In step S7, contrary to step S4, it is determined whether the difference $(A_0 - Ap)$ is larger than the tolerance range c. Since the current oxygen containing gas supply flow rate is small, the decision in step S7 is YES. Accordingly, in step S8 the oxygen containing gas supply flow rate through the variable capacity blower 16, is increased by one rank. Then in following step S9 the same operation as in step 6 is performed. More specifically, the information stored in the memory for storing the current oxygen containing gas supply flow rate is cleared and the newly determined information Ap is stored. Thus, one control cycle is completed. Each time the above described control cycle is repeated, the oxygen containing gas supply flow rate is increased by one rank, so that the current oxygen containing gas supply flow rate Ap is decreased. As a result, in step S7 of any given control cycle the difference $(A_0 - Ap)$ becomes smaller than the tolerance range c. This means that the current oxygen containing gas supply flow rate is controlled to fall within the tolerance range c shown in FIG. 2.

The case will now be considered where the current oxygen containing gas supply flow rate just falls within the tolerance range of the required oxygen containing gas supply flow rate $A_0$ corresponding to the monitored organic loading amount.

In such a case, as is apparent from the foregoing description of the above assumed first and second cases, the cycles preceding to the routine of the steps S1, S2, S3, S4 and S7 are repeated.

From the foregoing description in conjunction with the FIG. 3 flow diagram, a control for achieving a required oxygen containing gas supply flow rate corresponding to an organic loading amount shown in FIG. 2 is desirable. According to the basic principle of the present invention, even in the case where the organic loading amount becomes very small and ultimately zero, a required oxygen containing gas supply flow rate can be controlled accordingly even down to zero by stopping the blower.

In the case of the above described fundamental structure of the present invention described with reference to FIGS. 2 and 3, the flow rate of the mixed liquor circulated by the variable capacity pump 8 back into the downward flow chamber or path A was set to a predetermined relatively large flow rate W without taking into particular consideration the relationship between a supply flow rate of an oxygen containing gas supplied into the downward flow chamber and a flow rate of mixed liquor being circulated by the pump 8. However, the relationship between the oxygen containing gas supply flow rate A and the circulation flow rate W should be selected such that the gas/liquid ratio (A/W or A/(A+W)) may be smaller than 0.2, preferably the value should be smaller than 0.16. The reason is that if and when the gas/liquid ratio is larger than the above described value the so-called clogging phenomenon occurs in the flow chamber which makes it impossible to provide a stabilized mixture of gas and liquid in the circulation of the mixed liquor. In order to avoid such a situation, one approach may be employed in which the circulation flow rate is controlled on a stepwise basis in association with the required oxygen containing gas supply flow rate taking into consideration the above described gas/liquid ratio. Therefore, referring again to FIG. 2, the principle of controlling the circulation flow rate will be described. First, the initial circulation flow rate is assumed to be W1 and the range of the oxygen containing gas supply flow rate A for achieving the gas/liquid ratio $A/(A+AW1)=0.16$ is set to the above described initial circulation flow rate W1. If and when the gas/liquid ratio $(A/(A+W1)$ exceeds 0.16, the circulation flow rate is increased by one rank to be set to W2. A change of the circulation flow rate from W1 to W2 may be achieved by directly controlling the variable capacity type pump 8. Alternatively, such change may be achieved by providing a plurality of pumps 8 and by controllably changing the number of the variable capacity type pumps in accordance with the variation of the required oxygen containing gas supply flow rate. Thus, taking into consideration the gas/liquid ratio, the circulation flow rate can be increased or decreased in a stepwise manner by evaluating the gas/liquid ratio in each control cycle.

Figure 4:
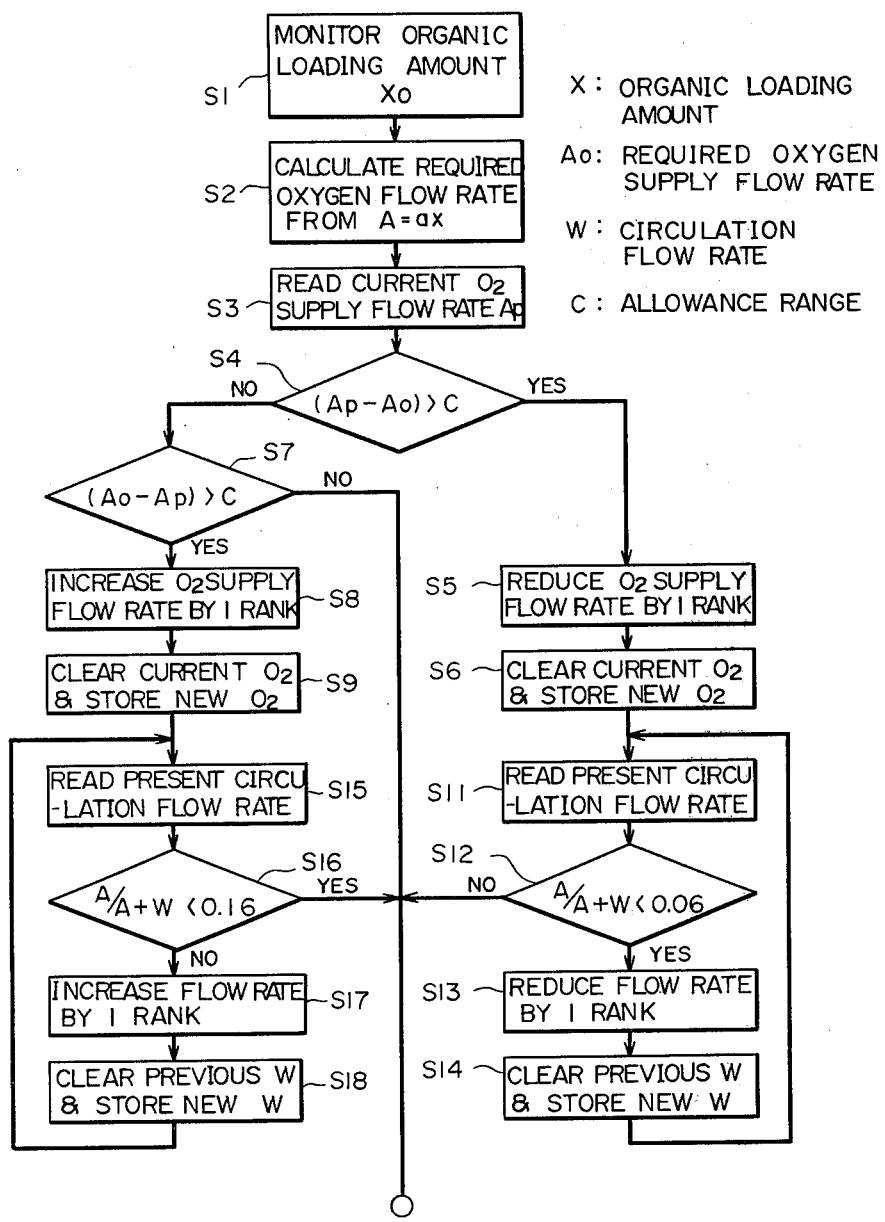
FIG. 4 is a flow diagram illustrating a controlling operation of the flow rate of an oxygen containing gas and the flow rate of the mixed liquor being circulated in response to the variation of the organic loading.

FIG. 4 is a flow diagram for depicting an example of controlling both the oxygen containing gas supply flow rate and the circulation flow rate as described with reference to FIG. 2. Basically, the steps S1 to S9 for determining the required oxygen containing gas supply flow rate are the same as those described in conjunction with FIG. 3.

First, the case will be considered where the oxygen containing gas supply flow rate A is presently excessive with respect to the monitored organic loading amount $x_0$ (FIG. 2).

In such a case the circulation flow rate so far supplied in accordance with the previous control is W3, as seen from FIG. 2. Now, referring to FIG. 4, the oxygen containing gas supply flow rate and the circulation flow rate are both decreased under these conditions. Since currently the oxygen containing gas supply flow rate is excessive, as assumed above, the program is executed in succession from the S1 to step S6 in accordance with the foregoing description in conjunction with the above assumed first case with reference to FIG. 3. After step S6, at step S11 the present circulation flow rate W as stored is read out from the memory. In the above described case, the current circulation flow rate W is W3. Then at step S12 the gas/liquid ratio $A/(A+W)$ is evaluated and it is determined whether the evaluated value is smaller than 0.06. Although in the above described example the circulation flow rate W is W3, the oxygen containing gas supply flow rate A has been decreased by one rank in step S6 from $A_\alpha$ to $A_{\alpha 0}$, whereby the gas/liquid ratio $A_{\alpha 0}/(A_{\alpha 0}+W3)$ becomes smaller than 0.06. Accordingly, it follows that the program proceeds from step S12 to step S13. In step S13 the circulation flow rate W1 is decreased by one rank to become W2. Then in step S14 the previous circulation flow rate W3 stored in the memory is cleared and the new determined circulation flow rate W2 is stored in the memory. After the circulation flow rate is thus decreased by one rank and the new information is stored, again the program proceeds to steps S11 and S12, whereupon the same operation is repeated. It is to be noted that, in such a case, in step S12 this time the circulation flow rate W is W2 and therefore the oxygen containing gas supply flow rate A is $A_{\alpha 0}$. As a result, the gas/liquid ratio $A_{\alpha 0}/(A_{\alpha 0}+W2)$ becomes larger than 0.06 and therefore the decision in step S12 becomes NO, whereby one control cycle is terminated. After the oxygen containing gas supply flow rate is thus decreased by one rank, the circulation flow rate corresponding to the decreased oxygen containing gas supply flow rate is set. If and when in the following control cycle the oxygen containing gas supply flow rate is further decreased by one rank, the circulation flow rate corresponding thereto is readily determined by the repetition of the above described operation.

Second, the case will be considered where the current oxygen containing gas supply flow rate is a value $A_\beta$ which is smaller than the permissible tolerance range of the required oxygen containing gas supply flow rate required for the organic loading amount $x_0$.

In such a case, the control cycle described in conjunction with the assumed second case with reference to FIG. 3, is performed in steps S1, S2, S3, S4, S7, S8 and S9. After step S9, the current circulation flow rate W stored in a memory is read out in the same manner as in the above described step S11. As shown in FIG. 2, the current circulation flow rate is W1. Then in step S16 the gas/liquid ratio $A/(A+W)$ is evaluated and it is determined whether the evaluated value is smaller than 0.16. It is assumed that the oxygen containing gas supply flow rate has been increase by one rank in step S8, whereby the oxygen containing gas supply flow rate $A_{\beta 0}$ has been reduced in the required tolerance range. Accordingly, it follows that $A/(A+W)=A_{\beta 0}/(A_{\beta 0}+W1)$. As is clear from the positional relationship shown in FIG. 2, that this value is larger than 0.16. Accordingly, the program proceeds from step S16 to step S17, wherein the circulation flow rate W is increased by one rank. More specifically, the circulation flow rate is controlled to become W2. Then, in step S18 the previous circulation flow rate W1 stored in the memory is cleared and the new circulation flow rate W2 is stored in the memory. Thereafter in steps S15 and S16 the same operation is repeated and, when the gas/liquid ratio $A/(A+W)$ becomes smaller than 0.16, for the first time one control cycle is ended.

When the present oxygen containing gas supply flow rate is within a proper tolerance range with respect to the organic loading amount $x_0$, one control cycle is terminated after the program proceeds through the steps S1, S2, S3, S4 and S7.

Figure 5:
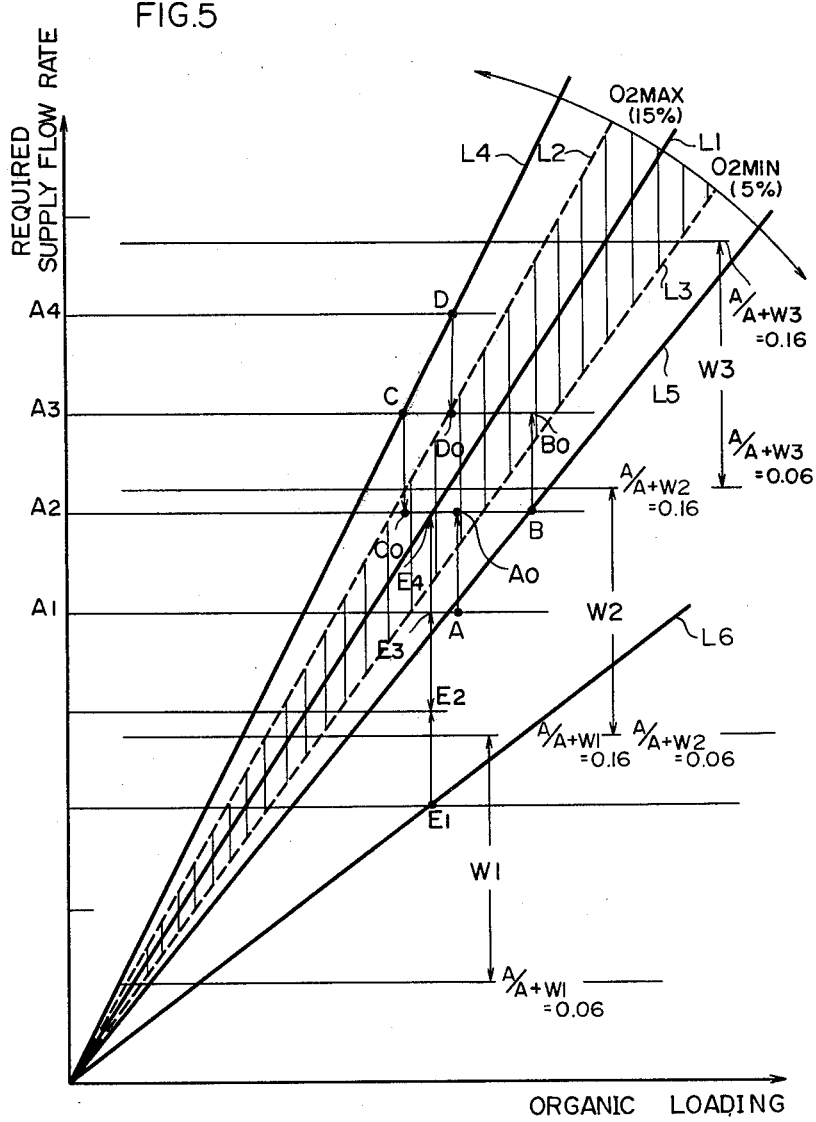
FIG. 5 is a graph for explaining the principle of another embodiment of the present invention.

FIG. 5 is a graph depicting the basic principle of another embodiment of the present invention. In the embodiment of FIG. 2 the organic loading amount was directly monitored and the required oxygen containing gas supply flow rate corresponding thereto was directly evaluated, whereas in the embodiment of FIG. 5 the organic loading amount is not directly, but rather indirectly monitored by monitoring the oxygen concentration or the carbon dioxide concentration of the exhaust gas discharged from the upward flow path or chamber B. The oxygen concentration or the carbon dioxide concentration of the exhaust gas is closely associated with the organic loading amount and hence such concentration may be used as information associated with or representing the organic loading in evaluating a required oxygen containing gas supply flow rate. To that end, the organic loading amount monitoring means 28 comprises an oxygen gas analyzer in FIG. 1. The top of the tank 6 is provided with a lid 30 for confining the exhaust gas discharged from the upward flow chamber. The exhaust gas discharged through the pipe 32 connected to the lid 30 escapes to the atmosphere, however, a portion of the exhaust gas is fed to the oxygen gas analyzer 28. Thus, the oxygen gas analyzer 28 monitors the concentration of the oxygen gas contained in the exhaust gas discharged at the top of the upward flow path or chamber B. If the concentration of the carbon dioxide gas contained in the exhaust gas is to be monitored, the monitoring means 28 will comprise a carbon dioxide gas analyzer. FIG. 5 also shows, basically in the same manner as in FIG. 2, the required oxygen containing gas supply flow rate along the ordinate and the organic loading amount along the abscissa. A functional relation of a straight line L1 is established to represent a required oxygen containing gas supply flow rate with respect to a given organic loading amount. However, in the embodiment presently described, the organic loading amount is not directly monitored but the oxygen concentration of the exhaust gas is used as a parameter. Variations in the oxygen concentration of the exhaust gas are indicated in the rotational direction about the origin point of the graph. The straight dashed line L2 shows the maximum tolerance value of the oxygen concentration in the exhaust gas, for example an oxygen concentration of 15% in the exhaust gas, whereas the straight dashed line L3 shows the minimum tolerance value of the oxygen concentration in the exhaust gas, for example an oxygen concentration of 5% in the exhaust gas. Thus, the system is controlled so that a required oxygen containing gas supply flow rate with respect to an organic loading amount may fall into the hatched area between the straight lines L2 and L3. For a more detailed description, it is assumed that the current oxygen containing gas supply flow rate is A1. In such a situation the oxygen concentration in the exhaust gas discharged through the upward flow chamber is monitored. It is assumed that the oxygen concentration in the exhaust gas is a value smaller than the minimum tolerance value. Assuming that a straight line with respect to the value smaller than the minimum allowance value of the oxygen concentration in the exhaust gas is L5, the intersection A between the line in parallel with the abscissa representing the oxygen containing gas supply flow rate A1 and the above described straight line L5 is a point representing a relation between the current oxygen containing gas supply flow rate and the organic loading amount. Since the point A is outside the allowance range, as shown in FIG. 5, it is necessary to increase the oxygen containing gas supply flow rate from A1 to A2 by one rank or step, so that the oxygen containing gas supply flow rate may be increased to fall within the tolerance range of the point $A_0$. Regarding the relationship of the circulation flow rate, what has been described in conjunction with FIG. 2 applies. Since in the above described example the oxygen containing gas supply flow rate is within the range of the circulation flow rate W2 even if the oxygen containing gas supply flow rate is increased by one rank or step, it is not necessary to control the circulation flow rate. However, assuming that the current oxygen containing gas supply flow rate is A2 and the oxygen concentration in the exhaust gas is smaller than the minimum tolerance value, say the oxygen concentration of the exhaust gas is that represented by the straight line L5, then the state of the current oxygen containing gas supply flow rate and the organic loading amount are represented by the point B. In this case, the oxygen containing gas supply flow rate must also be increased by one rank or step from A2 to A3 in the same manner as described in conjunction with point A. However, in this case the relationship of the gas/liquid ratio alone does not meet the requirement when the oxygen containing gas supply flow rate is increased, which means that the circulation flow rate also must be increased by one rank or step from W2 to W3, as seen from FIG. 5.

With regard to the relationship between the organic loading amount and the oxygen containing gas supply flow rate, consider a case or example wherein the current oxygen containing gas supply flow rate is too large, whereby the oxygen concentration in the exhaust gas discharged from the upward flow chamber becomes larger than a predetermined maximum allowance value, say 15%. Assuming that the present oxygen containing gas supply flow rate is A3 and the oxygen concentration in the exhaust gas at that time is that represented by the straight line L4, for example, then the state at that time of the oxygen containing gas supply flow rate and the organic loading amount is represented by the intersection C between a line in parallel with the abscissa representing the oxygen containing gas supply flow rate A3 and the straight line L4. Accordingly, the oxygen containing gas supply flow rate must be decreased by one rank or step from A3 to A2 to reach the point $C_0$ in the tolerance range. At that time the circulation flow rate must also be decreased simultaneously from W3 to W2. With regard to point D, however, only the oxygen containing gas supply flow rate must be decreased by one rank or step, while the circulation flow rate may be maintained, as is clear from FIG. 5.

Figure 6:
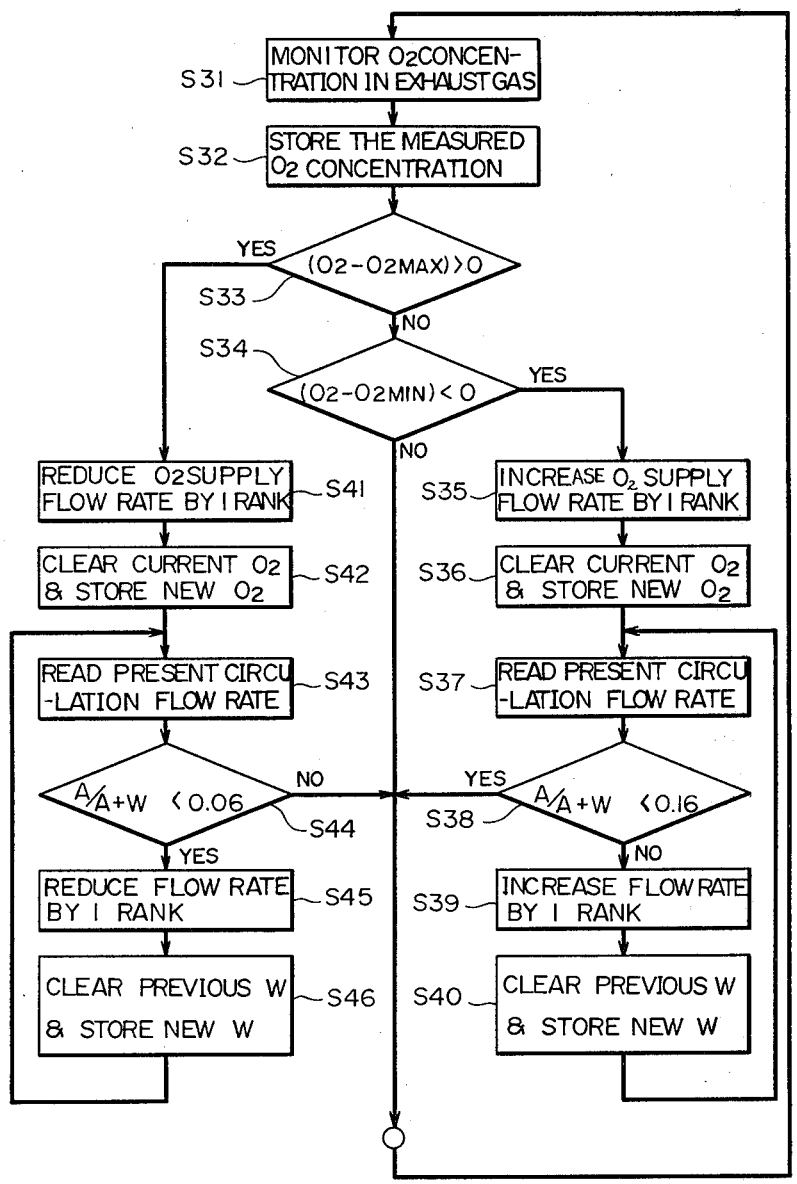
FIG. 6 is a flow diagram illustrating a controlling operation in accordance with the principle of FIG. 5.

FIG. 6 is a flow diagram for achieving the basic principle described in conjunction with FIG. 5. For facilitating the understanding, the values and symbols employed in describing FIG. 5 are employed in the following description as a specific example.

First, it is assumed that the current state is represented by point A. In such a state, the control which must be made is to increase the oxygen containing gas supply flow rate by one rank or step. First, in step S31 the oxygen concentration in the exhaust gas is monitored. In step S32 the monitored oxygen containing gas concentration in the exhaust gas is temporarily stored as $O_2$ in a memory. In step S33 the difference between the monitored value $O_2$ and the maximum tolerance concentration $O_{2MAX}$ stored in advance in the memory is evaluated and it is determined whether the evaluated value is plus or minus. Since the point A is on the line L5 which is smaller than the minimum tolerance represented by line L3, as seen from FIG. 5, the above described difference is minus. Accordingly, the program proceeds to the following step S34. In step S34 the difference between the monitored oxygen concentration $O_2$ and the minimum tolerance concentration $O_{2MIN}$ is determined and a check is made whether the difference is plus or minus. Since the monitored concentration $O_2$ in the exhaust gas is on the above described line L5, again the difference is minus. Accordingly, the program proceeds to step S35, wherein the oxygen containing gas supply flow rate is increased by one rank or step from A1 to A2. In step S36 the current oxygen containing gas supply flow rate stored in the memory is cleared, i.e. in this case the oxygen containing gas supply flow rate A1 is cleared, and the new oxygen containing gas supply flow rate A2 is stored. Thereafter, in step S37 the current circulation flow rate W is read out. As is clear from FIG. 5, the current circulation flow rate is W2.

At the following step S38 the gas/liquid ratio $A/(A+W)$ is evaluated and it is determined whether the evaluated value is smaller than 0.16. In the above described case, $A/(A+W)=A2/(A2+W2)$ and, as is clear from FIG. 5, the same is smaller than 0.16. Accordingly, the program returns from step S38 to step S31 for the purpose of the following control cycle. Thus, in one control cycle the control is such that point A becomes point $A_0$ within the tolerance range.

Second, in the example or case where the current state is represented by the point B the following applies. In this case both the oxygen containing gas supply flow rate and the circulation flow rate must be increased by one rank or step. The operation until the oxygen containing gas supply flow rate is increased by one rank or step is performed in the same manner as described in the above with reference to the first example while the program proceeds from step S31 to step S38. The calculation $A/(A+W)$ achieved in step S38 is $A3/(A3+W2)$ in this particular case. Since the evaluated value is clearly larger than 0.16, the decision in step S38 is NO. Accordingly, the program proceeds to step S39 wherein the circulation flow rate is increased by one rank or step from W2 to W3. Thereafter in step S40 the circulation flow rate W so far stored in the memory, in this particular case the circulation flow rate W2, is cleared and the new set circulation flow rate W3 is stored in the memory. Thereafter the program returns again to step S37 and the current circulation flow rate W is read out. Since the current circulation flow rate W has been renewed in previous step S40 from W2 to W3, the currently read out circulation flow rate W becomes W3. Then, in step S38 this time $A/(A+W)=A3/(A3+W3)$ and the evaluated value at that time becomes smaller than 0.16. Therefore, the decision becomes YES. Thus the oxygen containing gas supply flow rate and the circulation flow rate required therefore are controlled.

Third, in the example or case where the current state is represented by point C, the current oxygen containing gas supply flow rate is too large. The operation in steps S31, S32 and S33 is the same as those described in conjunction with the above described first example. In step S33 the difference $(O_2-O_{2MAX})$ becomes positive at this time, because the monitored value of the oxygen concentration in the exhaust gas is on the straight line L4 showing a value larger than the straight line L2 representing $O_{2MAX}$. Accordingly, the program proceeds from step S33 to step S41. In step S41 the current oxygen containing gas supply flow rate is decreased by one rank or step from A3 to A2 and in step S42 the oxygen containing gas supply flow rate A3 stored in the memory is cleared and the newly set oxygen containing gas supply flow rate A2 is stored in the memory. In step S43 the current circulation flow rate W is read out. In the particular case, the current circulation flow rate is W3. In step S44 the gas/liquid ratio $A/(A+W)$ is evaluated and in this particular case $A/(A+W)=A2/(A2+W3)$ and it is determined whether the same is smaller than 0.06. Since the circulation flow rate remains W3 whereas the oxygen containing gas supply flow rate has been decreased from A3 to A2, the evaluated value is smaller than 0.06. Accordingly, the program proceeds to the following step S45 wherein the circulation flow rate W is decreased by one rank or step from W3 to W2. In step S46 the circulation flow rate W3 so far stored in the menory is cleared and the newly set circulation flow rate W2 is stored in the memory. Thereafter the program returns to step S43 and again the current circulation flow rate is read out from the memory. Since the newly set circulation flow rate W2 has been stored at step S46, the current read out circulation flow rate W is W2. Accordingly, in following step S44 the gas/liquid ratio $A/(A+W)$ becomes $A2/(A2+W2)$ and, since this value is larger than 0.06 the decision in step S44 becomes NO. Thus, the required oxygen containing gas supply flow rate is decreased by one rank or step, while the circulation flow rate is also decreased by one rank or step.

Fourth, in the case where the current state is represented by point D, the same operation is performed during steps S31, S32, S33, S41, S42, S43 and S44 as in the above described third example. Since in S44 the gas/liquid ratio $A/(A+W)$ becomes $A3/(A3+W3)$, the evaluated value becomes larger than 0.06 and hence the decision in step S44 becomes NO. Thus, in this particular case, only the oxygen containing gas supply flow rate is decreased by one rank or step.

Fifth, in the case where the current state is represented by point E1 the monitored value of the oxygen concentration in the exhaust gas is extremely low and accordingly the control cannot follow such situation by simply increasing the oxygen containing gas supply flow rate by one rank or step. In this case, basically the operation during steps described in conjunction with the above described first and second cases are repeated, as is readily understood. In the case of an increase from pont E1 to point E2, the oxygen containing gas supply flow rate is increased by one rank or step while the circulation flow rate is also increased by one rank or step in accordance with the operation described in conjunction with the above described second case or example. Then in the following cycle, an increasing operation is performed from point E2 to point E3 and in this situation only the oxygen containing gas supply flow rate is increased by one rank or step in accordance with the operation described in conjunction with the above described first example. Then an increasing operation from point E3 to point E4 is also performed in the same manner as described in the above with reference to the first example. Thus, after three control cycles are repeated, the oxygen containing gas supply flow rate and the circulation flow rate required for the organic loading amount are determined.

The FIG. 6 embodiment adopted a sequence wherein the oxygen concentration in the exhaust gas is first monitored and then the required oxygen containing gas supply flow rate and the circulation flow rate are controlled with the oxygen concentration as a reference. However, alternatively the carbon dioxide concentration in the exhaust gas may be monitored and the required oxygen containing gas supply flow rate and the circulation flow rate may be controlled in response to said $CO_2$ concentration in the same manner as described. In such a case, in step S31 the carbon dioxide concentration is monitored in place of monitoring of the oxygen concentration and accordingly in step S32 the carbon dioxide concentration $CO_2$ is stored. In step S33 $(CO_2-CO_{2MIN})<0$ is determined. In step S34 $(CO_2-CO_{2MAX})>0$ is determined, whereby $CO_{2MIN}$ and $CO_{2MAX}$ denote the minimum tolerance concentration and the maximum tolerance concentration, respectively. Since the oxygen concentration and the carbon dioxide concentration in the exhaust gas are inverse proportional to each other, in the case where the carbon dioxide concentration is monitored, the relationship in steps S33 and S34 shown in FIG. 6 has been reversed.

Figure 7:
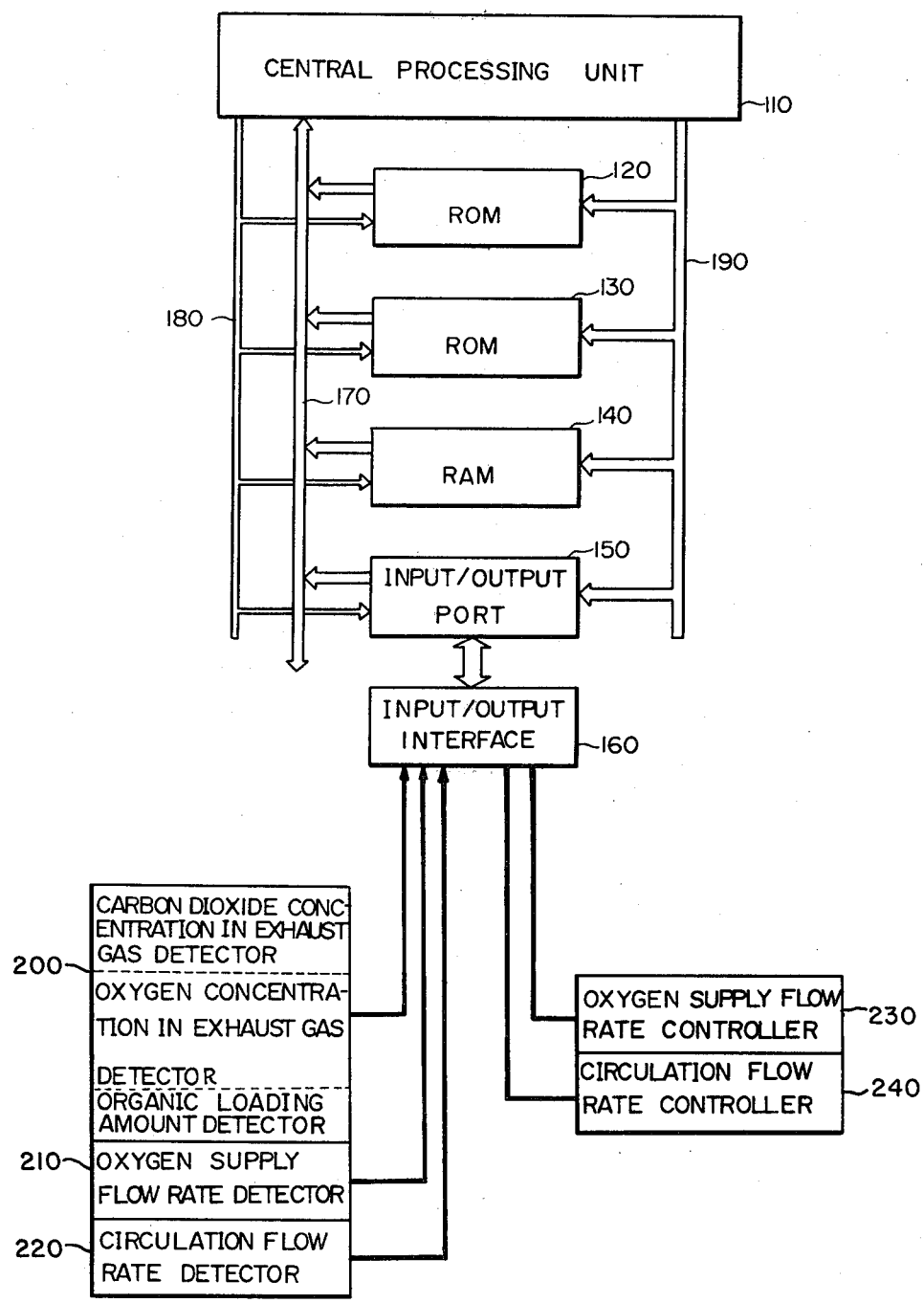
FIG. 7 is a hardware implementation of the control scheme according to the invention.

FIG. 7 is a block diagram showing a hardware implementation for achieving the control according to the invention. Basically, the inventive system comprises a central processing unit 110, a first read only memory 120 for storing a predetermined program, such as shown in FIGS. 3, 4 and 6, a second read only memory 130 for storing a function as shown in FIG. 2 set in advance for evaluating a required oxygen containing gas supply flow rate on the basis of a monitored organic loading value, a random access memory 140 for storing monitored data, and an input/output port 150. The information monitored by the monitoring means 200 is associated with or represents the organic loading value. Such information may include the carbon dioxide concentration in the exhaust gas or the oxygen concentration in the exhaust gas or directly the organic loading amount or value. The current oxygen containing gas supply flow rate is monitored by the monitoring means 210. The information of the current circulation flow rate is monitored by the monitoring means 220 of the waste water circulated by the pump from the upward flow chamber to the downward flow chamber. The respective information representing data are transferred through the input/output interface 160 and the data bus 170 for communication with the read only memories 120 and 130, the random access memory 140 and the input/output port 150. A control bus 180 and an address bus 190 are provided between the central processing unit 110, the read only memories 120 and 130, the random access memory 140 and the input/output port 150. More specifically, the random access memory 140 is used for storing the data being transferred. For example, in the case where the oxygen concentration in the exhaust gas is monitored, the information of the monitored oxygen concentration is transferred through the input/output interface 160, the input/output port 150 and the data bus 170 to the random access memory 140 and is stored therein. The central processing unit 110 performs a series of processing operations in accordance with a program stored in the read only memory 120. The newly set oxygen containing gas supply flow rate and the circulation flow rate obtained by calculation by the central processing unit 110 in accordance with the program stored in the read only memory 120, are transferred through the data bus 170 to the random access memory 140 and stored therein and are also transferred through the data bus 170, the input/output port 150 and the input/output interface 160 to the oxygen containing gas supply flow rate control apparatus 230 and to the circulation flow rate control apparatus 240.

Referring to the FIG. 4 program, for example, the steps for ascertaining the current oxygen containing gas supply flow rate and the current circulation flow rate are shown. These information items may be those provided by the oxygen containing gas supply flow rate monitoring means 210 and the circulation flow rate monitoring means 220 and stored in the random access memory. However, usually such oxygen containing gas supply flow rate and the circulation flow rate are those determined in the preceding control cycle and therefore the oxygen containing gas supply flow rate and the circulation flow rate determined in the preceding control cycle may be stored in the random access memory 140 and read out as necessary.

Figure 8:
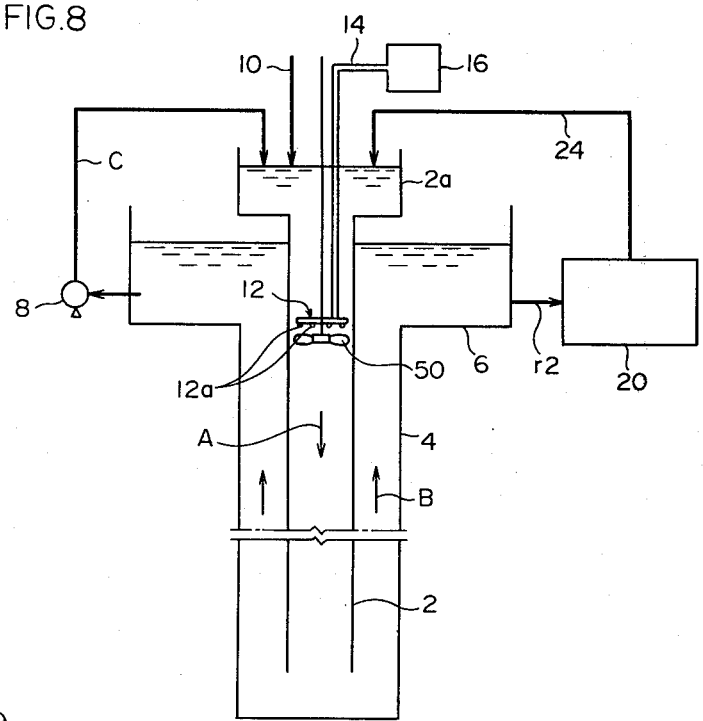
FIG. 8 is a view showing an outline of a modification of an oxygen containing gas supply means for use in the waste water treating apparatus of the invention.

FIG. 8 is a view schematically showing the overall outline of a modification of a supply means of an oxygen containing gas for use in the waste water treating apparatus of the invention. As described above, for the purpose of improving the solution of an oxygen containing gas into the waste water being treated, it is better or more efficient to supply rather fine bubbles of an oxygen containing gas into the water. The embodiment of FIG. 8 comprises an improvement for making such gas bubbles fine or rather, as small as possible. As seen, the basic structure of the FIG. 8 embodiment is substantially the same as that shown in FIG. 1. Accordingly, the same reference characters as those in FIG. 1 have been used to denote the same components in FIG. 8. The FIG. 8 modification comprises a screw or propeller 50 located below and near the lower portion of an exit 12a of a nozzle 12.

The propeller 50 is rotatable for causing a jet flow in the downward direction into the mixed liquor. The bubbles of an oxygen containing gas being supplied through the nozzle 12 are forcedly mixed by the screw 50 and thereby finely divided, while the same are forced downwardly as a downward circulation flow.

Figure 9:
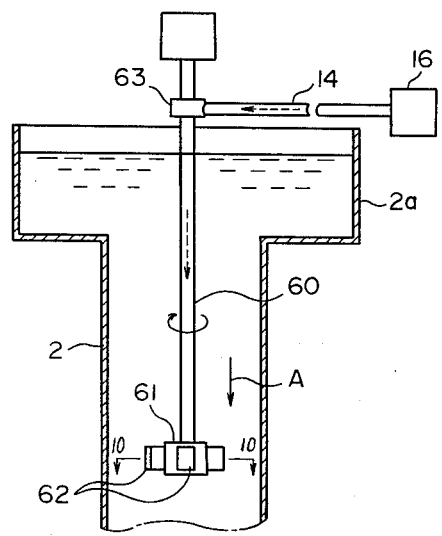
FIG. 9 is a sectional view of a major portion of a mixing section of the oxygen containing gas supply means of FIG. 8.
Figure 10:
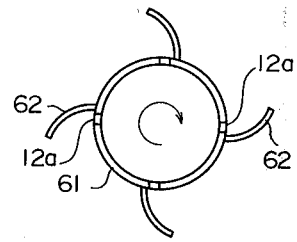
FIG. 10 is a sectional view taken along the line 10—10 in FIG. 9.

FIGS. 9 and 10 show different modifications of the FIG. 8 forced mixing portion. In these modifications, a hollow shaft 60 is rotatably mounted and a cylinder 61 with a closed bottom having the diameter larger than that of the hollow shaft is secured to the lower end of the hollow shaft 60. Screw blades 62 are secured to the cylinder 61 and spaced apart in the peripheral direction of the cylinder 61. Discharge ports 12a shown in FIG. 10 are positioned in the cylinder 61 adjacent to and behind, as viewed in the rotational direction, of the respective blades 62. The supply pipe 14 for supplying an oxygen containing gas and the above described hollow shaft 60 communicate with each other by means of a rotary joint or coupling member 63. Accordingly, the oxygen containing gas supplied by the blower or compressor 16 through the supply conduit 14 is fed through the rotary joint 63 and the hollow shaft 60 to the discharge ports 12a of the nozzle 12 or the cylinder 61. The gas bubbles discharging through the discharge ports 12a are dispersed into fine bubbles by means of the screw blades 62 or 50. With such structure, a negative pressure relative to atmospheric pressure is provided due to the rotation of the screw blades 50 or 62 when supplying the oxygen containing gas. Therefore, the water pressure from the water being treated with respect to the respective discharge ports 12a is decreased and accordingly the gas supply pressure and thus the driving power of the blower or compressor 16 may be decreased. It will be readily understood by those skilled in the art that for making fine bubbles of the oxygen containing gas in the water various modified structures other than the above described screws 50 and the screw blade 62 may be employed.

Thus, according to the embodiments shown in FIGS. 8 to 10, the bubbles of the oxygen containing gas being supplied to the mixed liquor are finely dispersed and therefore the buoyancy of the supplied gas may be decreased and the driving power for supplying the gas may also be decreased while a downward flow of bubbles together with the mixed liquor is preferably caused. In addition, since the bubbles are fine, the oxygen gas can be preferably dissolved under pressure.

Furthermore, since the buoyancy of the supplied gas can be suppressed, any growth of the bubbles generated in the vicinity of the inner surface at the upper end of the downward flow path or chamber A is not assisted by the supplied gas. Accordingly, the bubbles are prevented from growing into an air block, which might cause leakage of the waste water being treated.

It is pointed out that the foregoing description is only by way of example and various types of modifications may be made without departing from the spirit of the present invention. For example, the oxygen containing ratio may be monitored by gas analysis for the purpose of detecting an oxygen containing ratio in the exhaust gas. Furthermore, although in the above described embodiment the value evaluated by the control mechanism 100 is utilized as an amount of the oxygen containing gas being supplied from the variable capacity type blower or compressor 16 through the gas supply conduit 14 to the water being treated, the supply amount may be actually monitored directly from the gas supply conduit 14.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A waste water treating apparatus for treating waste water including an organic material, comprising: a downward flow chamber (2) disposed to extend in the depth direction for allowing a downward flow of a mixed liquor comprising said waste water to be treated and an activated sludge, an upward flow chamber (4) disposed in the depth direction outside and adjacent to said downward flow chamber for allowing an upward flow of said mixed liquor to be supplied through said downward flow chamber, circulation means (8) for circulating said mixed liquor through said upward flow chamber and through said downward flow chamber by raising said mixed liquor from said upward flow chamber to said downward flow chamber, gas supply means (16) for supplying an oxygen containing gas into said downward flow chamber, organic loading representing information providing means (28) operatively coupled to at least one of said upward flow chamber and said downward flow chamber for providing information associated with an organic loading of said waste water, first controlling means (16a, 100) responsive to said information from said organic loading representing information providing means (28) for controlling said oxygen containing gas supply means (16) so that a controlled quantity of supplied oxygen containing gas is the quantity necessary for treating said organic loading of the waste water in accordance with said organic loading associated information, and second controlling means (8a, 100) responsive to said controlled quantity of supplied oxygen containing gas for controlling said mixed liquor circulation means (8) so that the circulation flow rate of said mixed liquor is suitable for treatment by said controlled quantity of supplied oxygen containing gas.

2. The waste water treating apparatus in accordance with claim 1, wherein said organic loading representing information providing means (28) comprises first monitoring means for directly monitoring an organic loading quantity of said waste water, whereby said organic loading representing information comprises information corresponding to said organic loading quantity.

3. The waste water treating apparatus in accordance with claim 2, wherein
said monitoring means comprises an ultraviolet photo meter.

4. The waste water treating apparatus in accordance with claim 2, wherein said first controlling means comprises first storage means for storing a predetermined functional relationship between said organic loading quantity of said waste water and a required oxygen containing gas supply flow rate corresponding to said organic loading quantity, withdrawing means responsive to said organic loading quantity provided at an output of said monitoring means for withdrawing oxygen containing gas supply flow rate information corresponding to said output of monitoring means from said functional relationship stored in said first storage means, second monitoring means for monitoring the oxygen containing gas supply flow rate which is being presently supplied by said oxygen containing gas supply means (16), comparing means for comparing said oxygen containing gas supply flow rate information withdrawn by said oxygen containing gas supply flow rate information withdrawing means and said current supply flow rate information monitored by said second supply flow rate monitoring means, and controlling means responsive to the output of said comparing means for controlling said oxygen containing gas supply flow rate from said oxygen containing gas supply means (16) to fall within a predetermined tolerance supply flow rate range.

5. The waste water treating apparatus in accordance with claim 1, wherein the circulation flow rate of said mixed liquor being circulated by said circulation means (8) is set to a predetermined circulation flow rate, and wherein said second controlling means comprise determining means for determining whether the oxygen containing gas supply flow rate being supplied by said oxygen containing gas supply means is exceeding a predetermined oxygen containing gas supply flow rate corresponding to said predetermined circulation flow rate, and controlling members responsive to the output of said determining means for controlling said circulation means (8) so that the circulation flow rate may exceed said predetermined circulation flow rate of said circulation means.

6. The waste water treating apparatus in accordance with claim 5, wherein
said determining means is adapted to determine that said predetermined flow rate is exceeded by directly monitoring the oxygen containing gas being supplied by said oxygen containing gas supply means to said downward flow chamber (2).

7. The waste water treating apparatus in accordance with claim 5, wherein
said determining means comprises
second memory means for storing reference value information representing a predetermined value of said oxygen containing gas corresponding to said predetermined circulation flow rate, and
comparing means for comparing said reference value information stored in said second storage means with a required oxygen containing gas supply flow rate information withdrawn from said oxygen containing gas supply flow rate controlling means.

8. The waste water treating apparatus in accordance with claim 1, wherein said organic loading amount representing information providing means comprises monitoring means for monitoring an exhaust gas component contained in said exhaust gas discharged from said upward flow chamber (4), and wherein said organic loading amount representing information comprises information representing said exhaust gas component.

9. The waste water treating apparatus in accordance with claim 8, wherein said first controlling means comprises determining means for determining whether said exhaust gas component monitoring by said exhaust gas component monitoring means is between a predetermined maximum tolerance value and a predetermined minimum tolerance value contained in said exhaust gas, and controlling members responsive to the output of said determining means for controlling said oxygen containing gas supply flow rate from said oxygen containing gas supply means to fall within a predetermined tolerance supply flow rate range.

10. The waste water treating apparatus in accordance with claim 1, wherein said oxygen containing gas supply means comprises an oxygen containing gas supply device and fine bubble making means provided in the vicinity of an outlet of said oxygen containing gas supply means for finely dispersing said bubbles in said mixed liquor.

11. The waste water treating apparatus in accordance with claim 10, wherein said fine bubble making means constitutes an oxygen containing gas supply path.

12. The waste water treating apparatus in accordance with claim 10, wherein said fine bubble making means is formed independently of an oxygen containing gas supply path.

13. The waste water treating apparatus in accordance with claim 9, wherein said exhaust gas component comprises an oxygen gas concentration.

14. The waste water treating apparatus in accordance with claim 9, wherein said exhaust gas component comprises a carbon dioxide gas concentration.

* * * * *